United States Patent [19]

Shutterly

[11] 4,266,243
[45] May 5, 1981

[54] SCRAMBLING SYSTEM FOR TELEVISION SOUND SIGNALS

[75] Inventor: Harold B. Shutterly, Pittsburgh, Pa.

[73] Assignee: Westinghouse Electric Corp., Pittsburgh, Pa.

[21] Appl. No.: 33,065

[22] Filed: Apr. 25, 1979

[51] Int. Cl.³ .................. H04N 7/16; H04N 7/04; H04N 7/08
[52] U.S. Cl. .................. 358/121; 179/1.5 R; 179/1.5 S; 358/116; 358/145; 358/147; 358/120
[58] Field of Search ............... 358/116, 121, 145, 147, 358/120; 179/1.5 R, 1.5 S

[56] References Cited

U.S. PATENT DOCUMENTS

| 3,731,197 | 5/1973 | Clark | 325/32 |
|---|---|---|---|
| 3,773,977 | 11/1973 | Guanella | 179/1.5 S |
| 3,789,137 | 1/1974 | Newell | 358/127 |
| 3,819,852 | 6/1974 | Wolf | 358/145 |
| 3,824,467 | 12/1972 | French | 325/32 |
| 3,872,503 | 3/1975 | Shutterly | 360/8 |
| 3,925,612 | 12/1975 | Guanella | 179/1.5 R |
| 4,070,693 | 1/1978 | Shutterly | 358/122 |

*Primary Examiner*—Stephen C. Buczinski
*Attorney, Agent, or Firm*—C. M. Lorin

[57] ABSTRACT

An audio scrambler operates on segments of audio divided from a continuous audio signal to rotate head-to-tail the string of information contained in the segment by an amount which is at pseudo-random between the successive segments. When the segments are compressed to video format, the scrambled compressed audio signals are inserted into an unused line of the vertical blanking space of a television system for transmission with the video signals. The inserted audio is combined with decoy signals, also in the vertical blanking space to increase security of transmission. Concurrent scrambling of compressed audio signals and video signals is provided.

4 Claims, 5 Drawing Figures

SCRAMBLING SYSTEM FOR TELEVISION SOUND SIGNALS

BACKGROUND OF THE INVENTION

The invention relates to an audio scrambler which can be used singly, or in combination with, a video scrambler.

Signal scrambling techniques are known in audio as well as in video systems for the purpose of preventing unauthorized hearing or viewing. In contrast to a cryptographic security system, a scrambler system does not necessarily provide total privacy in the communication. It does not insure that the message will not be unscrambled by somebody determined to do it. At least scrambling will make it difficult, or costly, for someone to reconstitute the scrambled message without the knowledge of the code.

The present invention adapts for audio scrambling a technique which has been disclosed in a television system for video scrambling. The technique is found in U.S. Pat. No. 4,070,693 issued Jan. 24, 1978 to Harold B. Shutterly. While the scrambling method in the patent is applied exclusively to a television video signal, it affords several advantages when, as proposed by the present invention, it is adapted for audio scrambling in general, and more particularly, used for transmitting the audio on the video channels of a television system.

It is known in the prior art to concurrently scramble the audio and the video signals of a television system. See for instance U.S. Pat. No. 3,919,462 of A. Hartung et al., No. 3,852,519 of Patrick R. J. Court and No. 3,736,369 of Joseph H. Vogelman et al.

It is known from U.S. Pat. No. 3,872,503 of H. B. Shutterly, to divide a continuous signal into successive segments, or samples and with these to generate time-compressed audio signals in the video format which can be accommodated with true video signals for concurrent use, e.g. for transmission in a television system. Discontinuities and unwanted transients at the junction between segments are eliminated from the constructed signal by adding repeated portions of the segment, or sample, at the ends thereof.

It is known from U.S. Pat. No. 3,789,137 of George F. Newell to time-compress segments of an audio signal to convert them into video format for recording, or transmission. Analog-to-digital conversion and digital to analog conversion at both ends of the conversion scheme are used with two registers for alternately processing in digital form successive segments divided from the original continuous audio signal.

It is known from U.S. Pat. No. 3,731,197 of J. E. Clark to divide a continuous audio signal into successive segments which are sampled for storage and scrambling in accordance with a code before transmission. The same code at the receiving end allows reconstruction of the segments and continuous reproduction of the audio signal.

It is known from U.S. Pat. No. 3,824,467 of R. C. French, or U.S. Pat. No. 3,970,790 of G. Guanella, to divide an audio signal into segments and to rearrange such segments so as to form an unintelligible transmitted signal.

It is known from U.S. Pat. No. 3,925,612 of G. Guanella, et al. to scramble a polarity modulated message pulse series with a shift register which is scrambled cyclically, scrambling being obtained by output feed back into selected locations of the shift register.

It is known from U.S. Pat. No. 3,819,852 of Peter Wolf to store the audio in time-compressed form during the period of a line in the vertical blanking interval subsequently to the video signal.

SUMMARY OF THE INVENTION

When dividing a continuous audio signal into segments in order to scramble the divided segments for transmission and unscrambling when received, the effectiveness of the method depends upon the size of each segment, since the more information there is contained in one segment, the more effect will scrambling have on the transmitted message.

It is proposed to divide a continuous audio signal into segments having a substantial length in order to maximize the information contained in each segment within the constraint of the transmission and reception process. Thereafter, each audio segment is submitted to a scrambling process such as described for video signals in U.S. Pat. No. 4,070,693 of H. B. Shutterly.

As applied to an audio signal the technique according to the present invention consists in:

converting the audio signal into a series of digital samples for the duration of an audio segment;

cyclically extracting such samples by scanning the samples in successive order from one ranking position selected in a pseudo-random fashion between successive segments;

compressing the extracted samples to form a group of compressed samples extending for the time span of a video line;

converting said compressed group of samples into an analog and video format audio signal;

inserting said video format audio signal into a selected line within the vertical blanking space between video lines and transmitting said audio signal with the video signals.

The method is completed at the receiver end by a reverse process consisting in deriving separately each received audio signal, reconstructing audio segments and combining segments to form a continuous audio signal as a faithful representation of the original continuous audio signal.

The invention also provides for cascade scrambling in two stages, by adding a second scrambling stage operative on both the already scrambled samples in video format and the video signals, like in U.S. Pat. No. 4,070,693.

The object of the present invention can be implemented with several modifications. Thus, the inserted audio can be transmitted by the television system from video frame to video frame or from video field to video field.

Increased secrecy is achieved by inserting the scrambled and compressed audio signal in any of the lines available in the vertical blanking space, together with decoy signals, the line selected for the audio signal being varied in a pseudo-random fashion throughout the successive video fields, or frames.

DESCRIPTION OF THE PREFERRED EMBODIMENT

Figure 1:
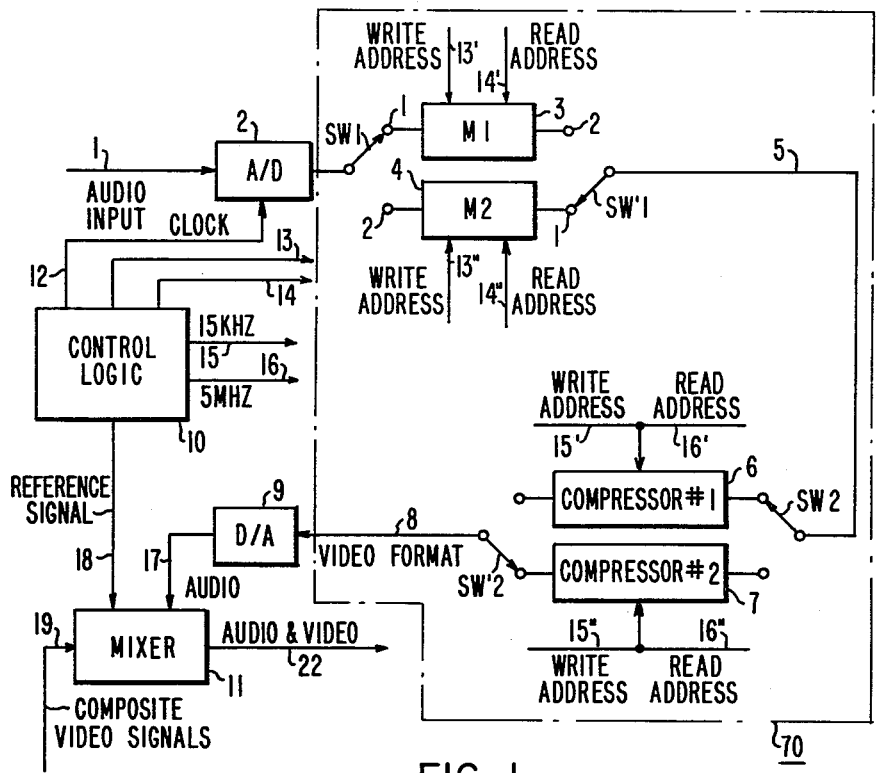
FIG. 1 is a diagramatic representation of the overall scheme according to the present invention for scrambling an audio signal and transmitting the scrambled audio signal together with the video signal of a video system.

FIG. 1 shows in block diagram form the overall scheme used, according to the invention, for scrambling an audio signal and transmitting it in video format together with the video signals of a video system. The video mixer 11 has associated to it a control logic 10 and an audio signal processing channel controlled by the control logic. The audio processing channel includes an analog-to-digital converter 2 responsive to a continuous audio signal inputted on line 1. Two memory devices 3, 4, each in the form of a RAM (random access memory) device are respectively and alternately switched to the output of A/D converter 2 and to an output line 5 by the logic of circuit 10, as symbolized by switches $SW_1$, $SW'_1$. When switch $SW_1$ connects A/D converter 2 to the input of device 3, switch $SW'_1$ connects the output of device 4 to line 5, as shown on FIG. 1, and conversely. A clock signal on line 12 from circuit 10 establishes a sampling rate for A/D converter 2, thereby to convert the audio input into successive digital samples, each defining in binary form the magnitude of the audio input signal as sampled. These samples are successively stored into the locations of RAM device 3 by the effect of a Write address control signal coming via line 13 from logic circuit 10, and going to line 13' of device 3. In the meantime, logic circuit 10 controls, via lines 14 and 14", the Read process of the other RAM device 4, whereby the samples from the successive locations are being passed by switch $SW'_1$ onto line 5. The switching frequency of switches $SW_1$, $SW'_1$ is a function of the sampling rate of A/D converter 2 and of the number of locations in the RAM devices. Memories $M_1$, $M_2$ provide segments divided from the input analog audio signal when devices 3 and 4 are being alternately operated upon. These segments are chosen to be of sufficient duration to bear substantial message information. The sampling rate typically is selected to be 14.4 KHz on line 12. Also, typically, RAM devices 3 and 4 have each 4096 locations by manufacturer's design. With a sampling frequency of 14.4 KHz and 8-bits per sample, there can be stored 3840 samples for a total duration of 267 milliseconds, which duration is defined by the alternate rate of $SW_1$, $SW'_1$. 267 milliseconds is also the effective duration of the audio segments in such instance. Control logic circuit 10 applies to the reading process of alternate RAM devices 3, 4 the pseudo-random technique of Shutterly U.S. Pat. No. 4,070,693 defined as a cyclical rotation head to tail of the entire string of stored samples. The Read address is on line 14' for device 3, on line 14" for device 4. The address is given in binary form according to a pseudo-random pattern, e.g. one location is selected at pseudo-random as the initial location for cyclical scanning of the device being read-out. All the other locations of the device are thereafter scanned cyclically in successive order.

Therefore, the reading process in fact effects a rotation of the entire sequence of samples initially stored e.g. by 13' or 13", into device 3, or 4. Such scrambling method of a series of orderly samples distinguishes itself over the prior art method consisting in changing the relative positions of many samples, like in U.S. Pat. No. 3,970,790 of S. Guanella. As already mentioned, the audio scrambling technique applied to devices 3 and 4 is like in U.S. Pat. No. 4,070,693 of Shutterly.

Thus, on line 5 scrambled segments are being passed from either device 3, or device 4, which digitally correspond to an audio segment. Such scrambled segments are further processed in the processing channel by compressor devices 6 and 7 which are alternately controlled by logic circuit 10, as symbolized by switches $SW_2$, $SW'_2$, one at the input, the other at the output of the compressor device. The digital bits are first being stored into device 6 or 7, depending upon the position of switch $SW_2$. While storing is at the clock rate of the samples, e.g. 14.4 KHz in the example, data from device 6, or 7 is read-out at a much higher speed, typically at 5.12 MHz in the example, e.g. under the effect of a Read address applied via lines 16 and 16' or 16 and 16", depending upon whether the position of $SW'_2$ is toward device 6, or device 7. With 240 samples being read-out from one device at a 5.12 MHz rate, the samples are outputted on line 8 in a time span of 50 μs, e.g. within the standard video-line format. Conversion into analog form by D/A converter 8 permits, with filtering if necessary, the recovery of an audio signal in compressed form.

The video mixer 11 is receiving on line 19 composite video signals of the video system, which may, or may not, have to be scrambled in accordance with the Shutterly U.S. Pat. No. 4,070,693. To mixer 11 are also applied the compressed and scrambled audio packs via line 17. While there is 1/60 of a second between successive fields of the video system, assuming a 525 lines standard video system, there are actually 262.5 lines available during such 1/60 of a second interval, 240 of which are visible and 22.5 more lines which are not used for video and left unoccupied in the vertical blanking space between visible frames. While deriving on line 5 one segment from device $M_1$ or $M_2$, the data are shifted by $SW'_2$ at a rate of 1/60 second from compressor #1 onto compressor #2, and conversely. Therefore, $SW_2$ and $SW'_2$ in fact derive successive groups of 240 samples which are read at a rate of 5.12 MHz, that is in 48 μs for conversion to video format.

At some instant (once during each interval of 1/60 second (as defined by switches $SW_2$, $SW'_2$) logic circuit 10 inserts the compressed audio signal, which is 48 μs long, into line 22, together with the composite video signals derived on line 19, so that when transmitted by mixer 11 it will be inserted into one of the lines available in the vertical blanking space between video fields.

Figure 2:
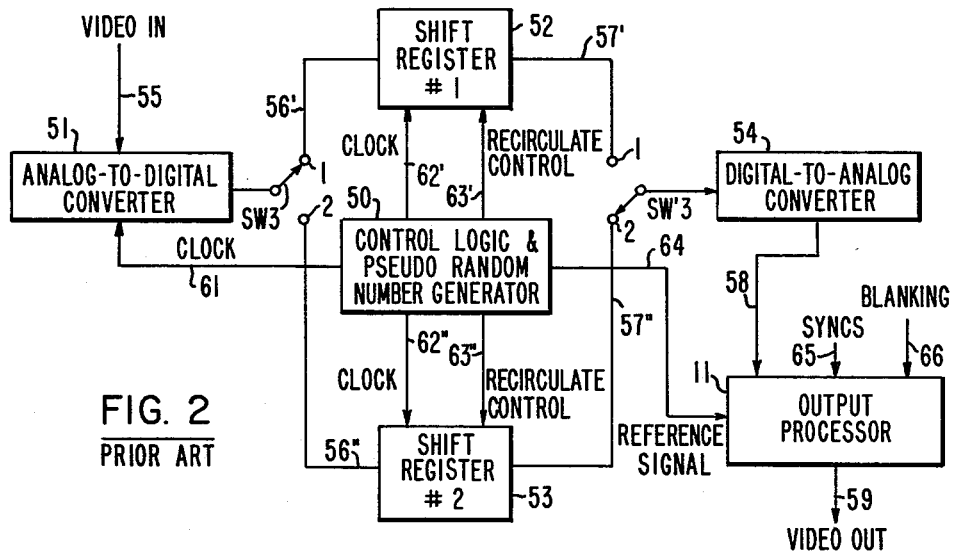
FIG. 2 shows a video scrambler of the prior art which can be used in the preferred embodiment of the invention.

The invention is used preferably with a scrambling video system such as disclosed in U.S. Pat. No. 4,070,693 of Shutterly. For the purpose of the description hereinafter of the preferred embodiment of the invention, the Shutterly patent is hereby incorporated by reference. The Shutterly video scrambled is shown in block diagram in FIG. 2.

Figure 3:
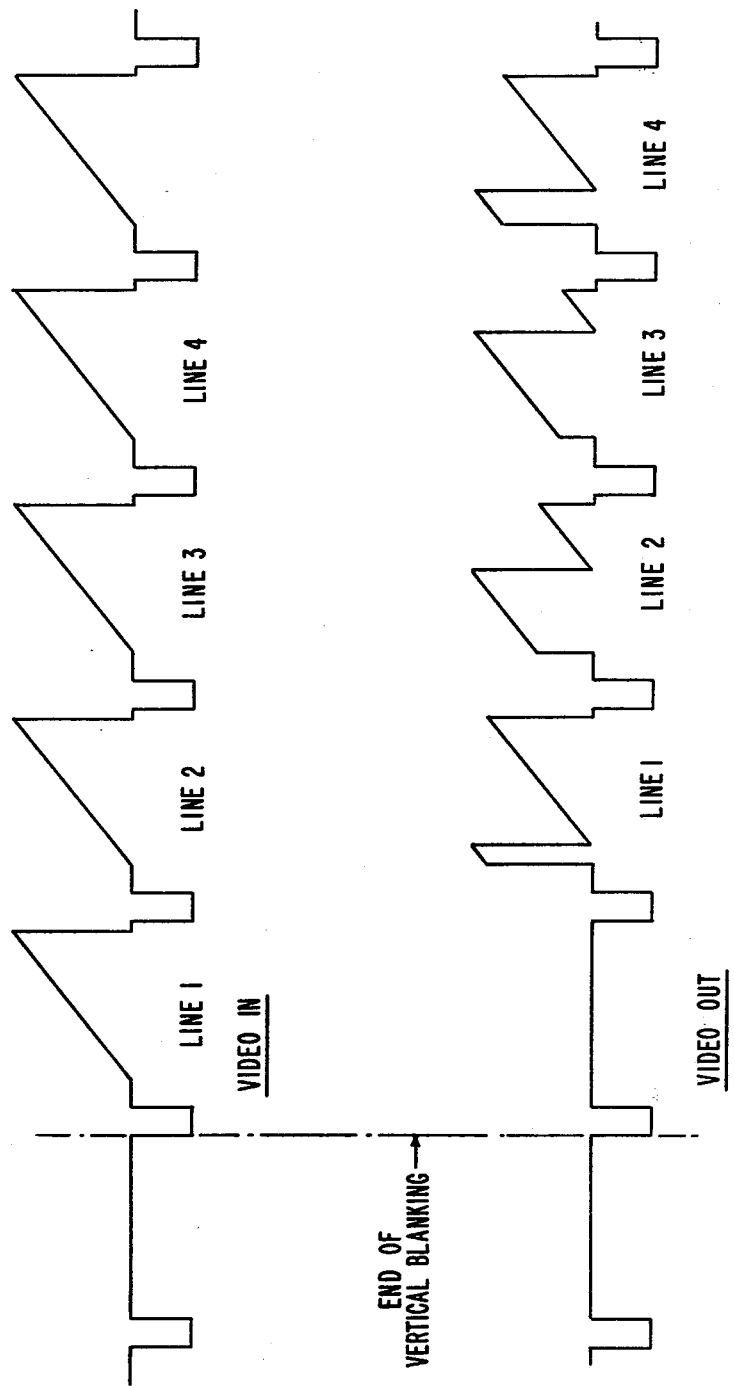
FIG. 3 shows the video lines outputted by the transmitter and video scrambler according to FIG. 2.

The analog video signal received on line 55 is converted into a sequence of binary numbers by analog-to-digital converter 51, which is clocked via line 61 by control logic circuit 50. Initially, the binary numbers representing the first active video line are clocked, via switch SW₃ in position #1 and line 56', into a first shift register 52. At the end of video line #1, switches SW₃, SW'₃ are thrown by logic circuit 50 into respective positions #2 and #1. Now, the video line #2 is clocked by logic 50 via line 61 (controlling A/D converter 51) and via line 62″, into a second shift register 53 through switch SW₃ and line 56″. Meanwhile, the binary numbers 0tored in shift register 52 for video line #1 are recirculated through a controlled number of shifts determined by circuit 50, via line 63' and read-out in this order via SW'₃ in the first position. As shown in FIG. 3, at this moment video line #1 is occurring at the output. Now, video line #3 is admitted via line 56' into shift register 52, while the recirculated video line #2 has its binary numbers (stored in shift register 53) being recirculated through another controlled number of shifts determined by circuit 50, via line 63″ and outputted via lines 57″ and SW'₂ in the second position. Next, video line #4 is admitted into shift register 53 with switch SW₃ in the second position, while recirculated video line #3 emerges on line 57 through switch SW'₃ in the first position. These steps repeat themselves ad infinitum so that the successive video lines #1, #2, #3, etc. are in fact inputted into digital-to-analog converter 54 in scrambled form. The successive numbers of shifts controlled by lines 63' and 63″ from logic circuit 50, follow a predetermined pseudo-random pattern, which will be used at the receiver station for sampling by the same reverse process in reverse. From D/A converter 54, the scrambled video signals are processed for transmission by an output processor 11 in relation to a signal received on line 65 and a blanking pulse, on line 66, as generally known with television systems. The outputted video lines appear successively on line 54 in the order required for ulterior field scanning and frame build-up at 1/60 of a second between blanking pulses and with a total of 525 lines per frame as in a standard television system.

FIG. 3 shows the signal waveform that would result from applying this processing to a sawtooth video signal. As explained from processing the initial video lines #1 and #2, and as shown in FIG. 3, the transmitted video signal on line 59 is delayed by one period relative to the inputted video signal of line 55.

Figure 4:
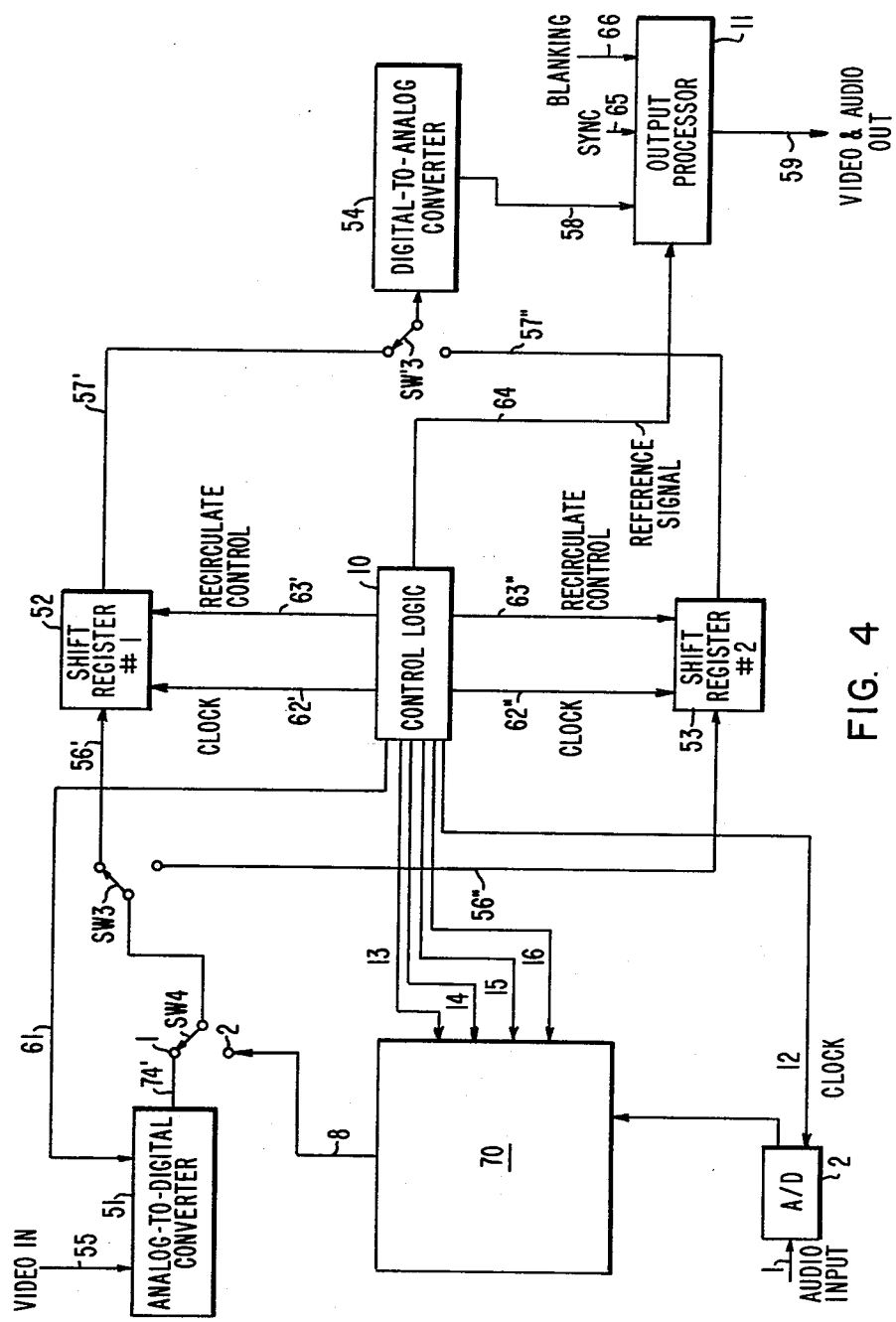
FIG. 4 is the video scrambler of FIG. 2 embodying at the transmitter side the audio scrambler according to the invention.

As shown in FIG. 4, the video scrambling system of the Shutterly patent can be modified to introduce concurrent audio scrambling. This can be implemented by adding a second scrambling stage following the stage shown by FIG. 1. This is achieved at minimum cost because the audio scrambling channel uses a large portion of the video scrambling portion which is already installed, including the pseudo-random number generator and the shift register for recirculation of either the video line signals, or the audio signals, after they have been given the same format. As shown in FIG. 4, the transmitter includes a first scrambling stage which operates on the audio segments like the portion of circuitry identified by block 70 in FIG. 1. The transmitter further includes a second scrambling stage applied to the already scrambled audio of line 8 when the insertion into the vertical blanking space is required, and in concurrence with a video line to the video signals as they occur on line 55. The pseudo-random number generator is part of the control logic circuit 10. This is a generally known technique. One technique to achieve a pseudo-random number sequence pattern is disclosed in Shutterly U.S. Pat. No. 4,070,693. A similar circuit arrangement controlled in the recirculating mode by an identical pseudo-random number generator, is used at the receiver. When the shift register recirculations have been made the complement of those of the transmitter shift register, it is apparent that the video signal is restored to its original form. The reference signal on line 64 from logic circuit 50 is used as a synchronizing code added to the transmitted video signals to make the pseudo-random generator of the receiver synchronous with the one of the transmitter. Signal processing is fully disclosed in the Shutterly patent which has been incorporated by reference.

Referring to FIG. 4, in operation, the scrambled signal in digital form of line 8 is supplied to the second position contact of switch SW₄. Switch SW₄ symbolizes control by logic circuit 10 in such a way that for switch position #1 the video signals from A/D converter 51 are derived between field blanking pulses. When the field blanking period occurs, switch SW₄ is being thrown into position #2 and audio data from line 8 are transferred onto line 56' or 56″, according to the position of switch SW₃ at the moment. Thus, segments of the audio signal 1/60 second in duration are passed in compressed form between video lines of two successive fields. Once the audio signal has been stored in shift register 52, or 53, it is scrambled once more by recirculation. When switch SW₄ is on position #1, recirculation is applied in the same fashion to the video signals from line 74'. Recirculation is performed under control of logic circuit 10 via line 63' or 63″ onto shift registers 52 or 53. The output processor 11 transmits via line 59, the compressed and scrambled audio signal after digital-to-analog reconversion by converter 54 which is also used for the video signals since they both are in video format. Thus, transmission of the audio signal occurs in accordance with control by line 64 from circuit 10 within the blanking space defined between video lines of two successive fields.

Many possible variations are within the scope of the present invention. Typically, the number of samples required to transmit an audio signal 1/60 second long of high quality, is approximately 500. The number of samples required to transmit one line of a color television signal faithfully is closed to 1000. Compatibility is achieved with the following options. The audio signal may be sampled at the higher rate so as to produce the same number of samples per field, as there are in one line of video signal. Otherwise, only one line of compressed audio per frame shall be used, instead of one line per field, thus, accepting a somewhat reduced quality of reproduction. When the higher audio sampling rate is adopted, an auxiliary storing device is required in order to hold the samples generated while shift register is being emptied at high speed for one line period. Simultaneously, at the receiver, an auxiliary storing device will be used.

The compressed audio signal lends itself to several schemes which will provide a higher security than mere scrambling by shift registers 52 and 53. This comes from the fact that in a standard 525-lines television system, during the vertical blanking period there are ten or eleven lines available for data transmission, namely for a 525 standard lines standard, there are 262.5 lines per field, of which only 240–242 are truly visible and nine which are used in the blanking space for synchronization information. Each of these eleven lines are thus capable of carrying an audio signal. If one line is used for transmitting the audio signal, it is possible to add some meaningless audio signals and place them in the other lines, thus, increasing the security of the transmission. Such additional audio signals are being retrieved when reconstructing the audio message at the receiver end. The additional, or decoy signals could be scrambled with the true ones at the transmitter end, unscrambled at the receiver end, then, sorted out. It is also comtemplated to distribute the eleven decoy signals and true audio signal on a pseudo-random basis from field to field, thereby to achieve with a scrambling system a high degree of security.

Figure 5:
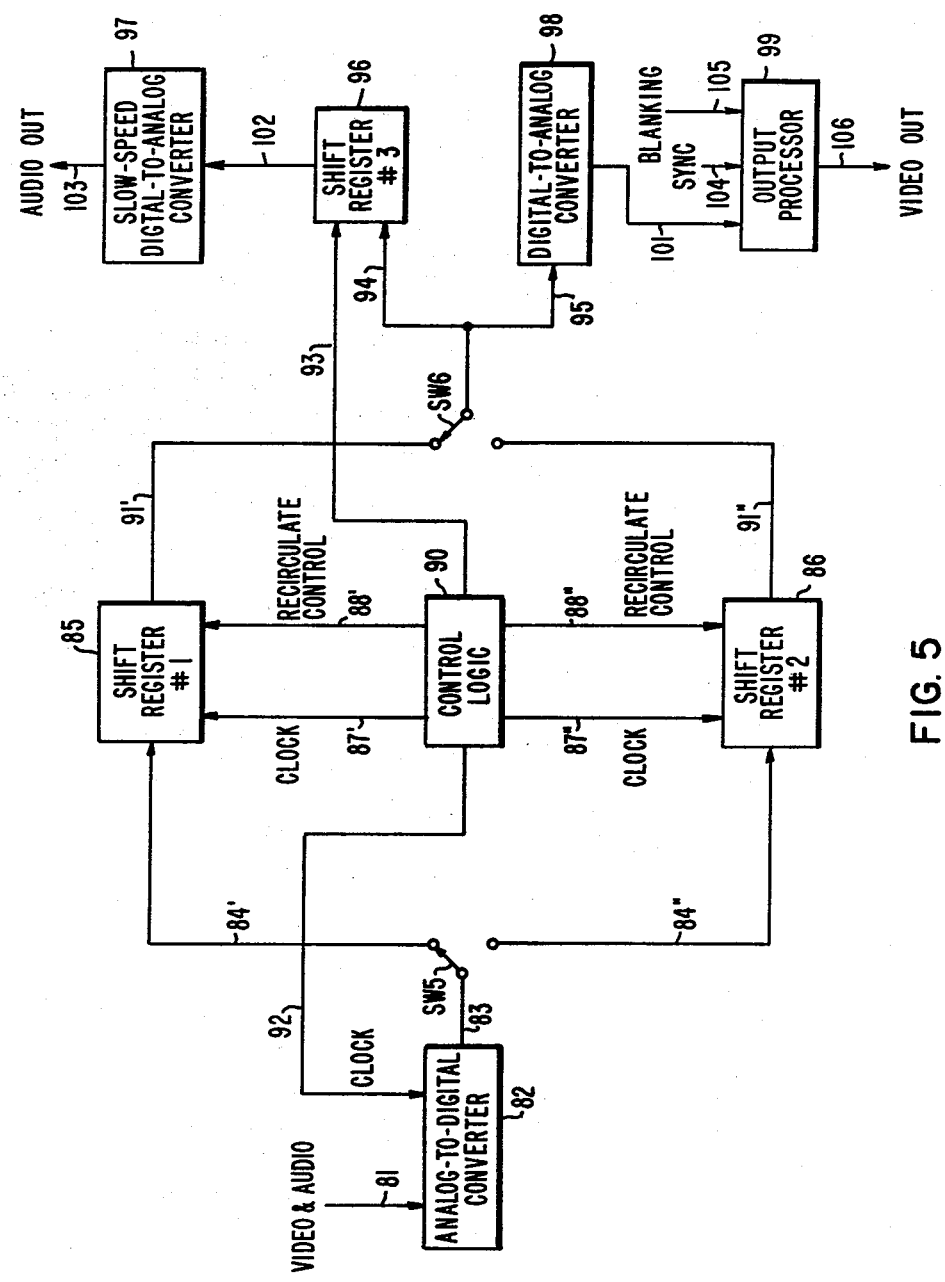
FIG. 5 is the audio unscrambler at the receiver side according to the preferred embodiment of the invention.

FIG. 5 shows the audio/video scrambler of the preferred embodiment at the receiver side. The video and audio signals received on line 81 are passed into an A/D converter 82 controlled by the control logic circuit 90 of the receiver, on line 92. The sampled numbers are alternately stored into shift register 85, or shift register 86, when control logic circuit 90 sets the entry switch SW$_5$ into position #1 (input line 84′), or into position #2 (input line 84″). The shift registers are clocked by lines 87′, 87″, respectively for entry of the binary segments of a video, or an audio signal. In a pseudo-random fashion which is complementary of the scrambling process at the transmitter, the contents of the shift registers are alternately recirculated under control of logic circuit 90 by line 88′, or 88″. The unscrambled signals are then transferred via lines 91′ or 91″ and switch SW$_6$ to one of two possible output channels which correspond to the two audio and video inputs of the transmitter, respectively. The video lines are immediately converted into analog form by D/A converter 98 and reconstruction of the image ensues through an output processor 99 responsive to the video line signals in line 101, the sync signal on line 104 and the blanking pulse on line 105. The outputted video is fed to the receiver's display tube by line 106.

The audio portion, on line 94, is fed into a shift register 96 for decompression into the original 1/60 of a second format and conversion into analog is effected by a low speed D/A converter 97. At the output, on line 103, appears a continuous audio signal which can be filtered if need be. Thus, the reverse process of the video and audio signals is a straight forward adaption from signal processing at the transmitter side.

There are many ways of implementing digital treatment of the signals for scrambling and/or for compressing. Solid state technology, and logic circuitry in hardware or software can be used wherever indicated. For instance the storing devices of FIG. 1 have been shown as RAM devices which are addressed by the control logic circuit, whereas shift registers have been shown in FIGS. 2, 4, and 5. It is understood that these are two equivalent means from which to choose for storing and recirculating the stored data in a pseudo-random fashion, thus to perform a "cyclical rotation" of a string of stored samples head-to-tail, thereby to effect or scrambling as explained in the aforementioned Shutterly patent.

I claim:

1. In a television system having a transmitter, a receiver and a communication channel for processing video signals, an audio-scrambler apparatus for a continuous audio signal to be transmitted through said television system comprising:

means for dividing said continuous audio signal into consecutive audio segments of a predetermined length;

first means for cylically rotating each of said divided segments in accordance with a pseudo-random pattern to derive rotated audio segments: second means for subdividing said rotated segments into subsegments and for compressing each of said subsegments down to the length of a video line of said television system;

scrambling means responsive to said compressed subsegments and to the video signals of said television system for cyclically rotating each of said compressed subsegments in time concurrence with the vertical blanking pulse of said television system and for cyclically rotating each video signal in time concurrence with the video lines, in accordance with another pseudo-random pattern to derive rotated compressed audio signals and rotated video signals; and third means responsive to the vertical blanking pulse of said television system for inserting each of said rotated compressed audio signals as a video line into a corresponding one of the vertical blanking spaces separating the active video lines of said television system and for generating a composite rotated audio and video signal to be transmitted.

2. The television system of claim 1, with decoy signals being respectively inserted into unused video lines within each of said vertical blanking spaces.

3. The television system of claim 2 with the successive said inserted compressed audio segments and associated decoy signals being distributed in a pseudo-random fashion between such unused video lines of the respective vertical blanking spaces of the television system.

4. The television system of claim 1 with an audio unscrambler apparatus associated with the receiver of said television system comprising:

fourth means responsive to the vertical blanking pulse of said television system for extracting the rotated audio signal from the associated rotated video signals;

means for separately unscrambling said rotated audio and video signal in accordance with said another pseudo-random pattern in reverse;

fifth means for decompressing the audio signal derived from said fourth means up to the length of said subsegments;

sixth means responsive to said fifth means accumulating said subsegments up to said predetermined length and for rotating back the accumulated audio signal with the first-mentioned pseudo-random pattern in reverse to form an audio segment which is a faithful representation of the original; and seventh means for outputting consecutive audio segments to form a continuous audio signal which is a faithful representation of the original.

* * * * *